United States Patent
Bahar et al.

(10) Patent No.: US 9,774,803 B2
(45) Date of Patent: Sep. 26, 2017

(54) MOTION REDUCING METHODS AND SYSTEMS USING GLOBAL SHUTTER SENSORS

(71) Applicant: Samsung Electronics Co., Ltd., Suwon-si, Gyeonggi-do (KR)

(72) Inventors: Mickey Bahar, Ramat Gan (IL); Uzi Hizi, Ramat Gan (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/046,555

(22) Filed: Feb. 18, 2016

(65) Prior Publication Data

US 2017/0244914 A1     Aug. 24, 2017

(51) Int. Cl.
*H04N 5/357*     (2011.01)
*H04N 5/235*     (2006.01)
*H04N 5/374*     (2011.01)
*H04N 5/378*     (2011.01)

(52) U.S. Cl.
CPC .......... *H04N 5/357* (2013.01); *H04N 5/2357* (2013.01); *H04N 5/374* (2013.01); *H04N 5/378* (2013.01)

(58) Field of Classification Search
CPC ......... H04N 5/2357; H04N 5/35536–5/35563; H04N 5/357; H04N 5/378; H04N 5/374
See application file for complete search history.

(56) References Cited

U.S. PATENT DOCUMENTS

| 8,384,800 B2 | 2/2013 | Sedelnikov | |
| 2010/0053346 A1* | 3/2010 | Mitsunaga | H04N 5/23248 348/208.6 |
| 2013/0135506 A1* | 5/2013 | Kobayashi | H04N 5/35554 348/311 |
| 2014/0247378 A1* | 9/2014 | Sharma | H04N 5/35536 348/280 |
| 2015/0163422 A1* | 6/2015 | Fan | H04N 5/35554 348/295 |
| 2016/0044223 A1* | 2/2016 | Harada | H04N 5/2353 348/207.11 |

* cited by examiner

*Primary Examiner* — Jason Flohre
(74) *Attorney, Agent, or Firm* — Harness, Dickey & Pierce P.L.C.

(57) ABSTRACT

At least one example embodiment discloses a method of generating an image using a global shutter image sensor. The method includes accumulating a first plurality of charges during a first exposure time from a first plurality of pixels, accumulating a second plurality of charges during a plurality of second exposure times from a second plurality of pixels, the plurality of second exposure times occurring during the first exposure time and being shorter than the first exposure time and generating the image based on the first plurality of charges and the second plurality of charges.

16 Claims, 13 Drawing Sheets

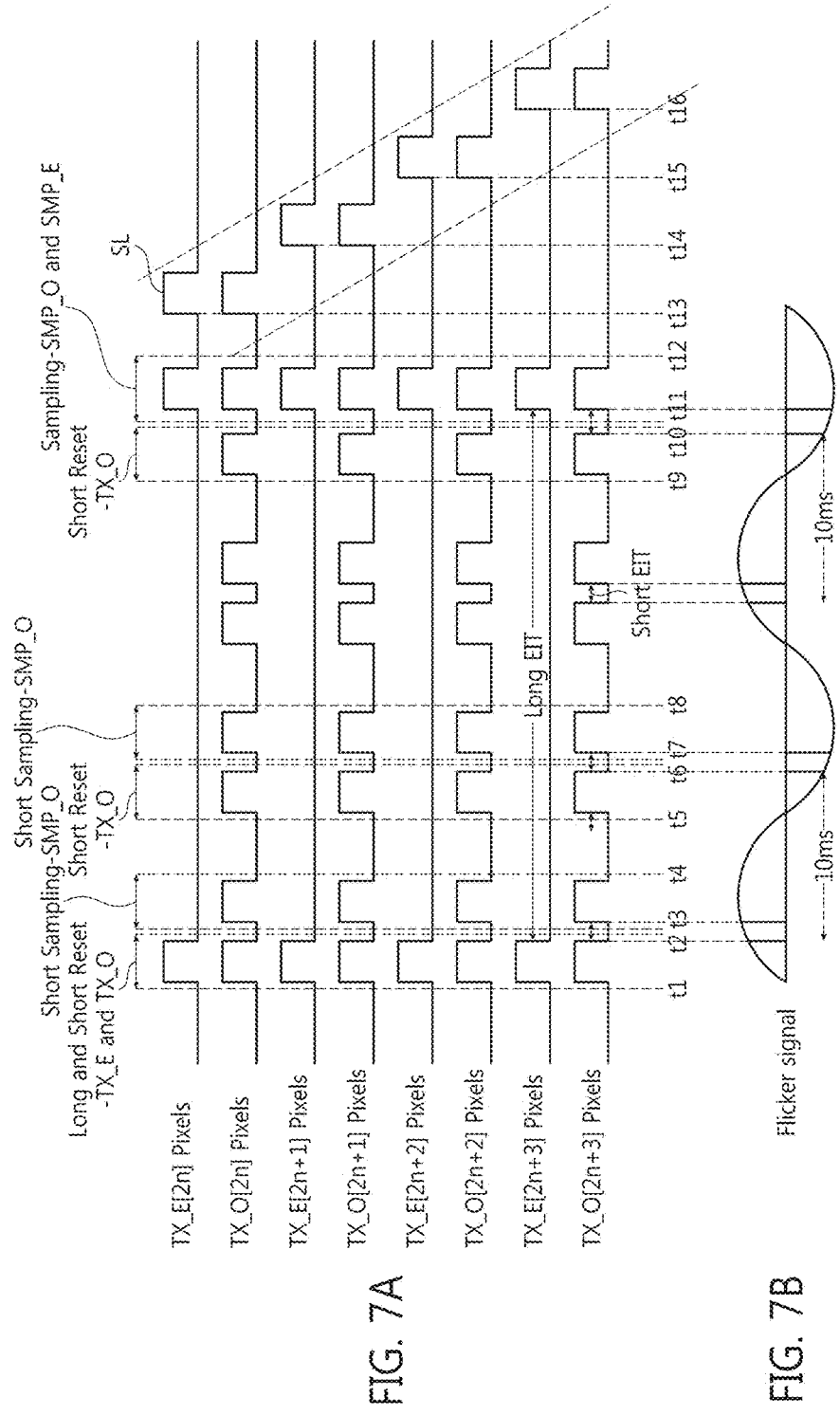

MOTION REDUCING METHODS AND SYSTEMS USING GLOBAL SHUTTER SENSORS

BACKGROUND

A digital camera includes an image sensor to generate an electronic image. Common image sensors may include a Charge Coupled Device (CCD) image sensor, a CMOS Image Sensor (CIS), for example.

In CMOS image sensors, the dynamic range of the sensor is limited by pixel capacity and by readout noise. The dynamic range can be enhanced, at the expense of spatial resolution, by combining data from pixels that are exposed for a long period of time with data from pixels that are exposed for short periods.

In more advanced image sensors with wide dynamic range (WDR), different pixels are associated with one of a plurality of exposure times. The pixel array may be controlled according to a given pattern of exposure times. However, a mosaic wide dynamic range (WDR) scheme may suffer from artifacts due to motion in the scene and from flicker due for short exposures.

SUMMARY

At least some example embodiments disclose methods and systems to eliminate motion and flicker artifacts in WDR scenes by using a global shutter sensor. At least one example embodiment includes dividing a short exposure pixels' period (integration period) into several shorter intervals and spreading the shorter periods over the duration of a long exposure pixels' integration time.

Each short integration interval is followed by a transfer of charge, in the short exposure pixels, from a photodiode to a sampling capacitor within the pixel, while long exposure pixels are still under integration. The short integration pixels' charge is accumulated on the sampling capacitor. The stored charges on the sampling capacitors become ready for readout in the entire APS array.

Motion artifacts are removed because short integration intervals are aligned with the long integration time and, therefore, both integrations are sensitive to object movement over the same period of time. Flicker cancelation is enabled through the fact that short integration periods may be located at the opposed periods of the flicker cycle and therefore cancel each other.

At least one example embodiment discloses a method of generating an image using a global shutter image sensor. The method includes accumulating a first plurality of charges during a first exposure time from a first plurality of pixels, accumulating a second plurality of charges during a plurality of second exposure times from a second plurality of pixels, the plurality of second exposure times occurring during the first exposure time and being shorter than the first exposure time and generating the image based on the first plurality of charges and the second plurality of charges.

In an example embodiment, each of the plurality of second exposure times is based on a flicker signal.

In an example embodiment, half of the plurality of second exposure times corresponds to a positive portion of the flicker signal and another half of the plurality of second exposure times corresponds to a negative portion of the flicker signal.

In an example embodiment, the first plurality of pixels and the second plurality of pixels are in a same row of the image sensor.

In an example embodiment, the method further includes first sampling the accumulated second plurality of charges after each second exposure time.

In an example embodiment, the method further includes second sampling the accumulated first plurality of charges after the first exposure time.

In an example embodiment, the first sampling and the second sampling end at the same time.

In an example embodiment, the method further includes transferring the first plurality of charges and the second plurality of charges at a same time.

At least another example embodiment discloses an image processing system including an image sensor configured to accumulate a first plurality of charges during a first exposure time from a first plurality of pixels and accumulate a second plurality of charges during a plurality of second exposure times from a second plurality of pixels, the plurality of second exposure times occurring during the first exposure time and being shorter than the first exposure time, and a processor configured to generate an image based on the first plurality of charges and the second plurality of charges.

In an example embodiment, each of the plurality of second exposure times is based on a flicker signal.

In an example embodiment, half of the plurality of second exposure times corresponds to a positive portion of the flicker signal and another half of the plurality of second exposure times corresponds to a negative portion of the flicker signal.

In an example embodiment, the first plurality of pixels and the second plurality of pixels are in a same row of the image sensor.

In an example embodiment, the processor is configured to sample the accumulated second plurality of charges after each second exposure time.

In an example embodiment, the processor is configured to sample the accumulated first plurality of charges after the first exposure time.

In an example embodiment, the first sampling and the second sampling end at the same time.

In an example embodiment, the processor is configured to transfer the first plurality of charges and the second plurality of charges at a same time.

BRIEF DESCRIPTION OF THE DRAWINGS

Example embodiments will become more appreciable through the description of the drawings in which:

FIGS. 1B and 1C illustrate mosaic patterns for WDR according to example embodiments.

FIG. 7A illustrates a timing diagram for WDR global shutter operation according to an example embodiment.

FIG. 7B illustrates a flicker signal and a correspondence with the timing described in FIG. 7A.

DETAILED DESCRIPTION

Figure 1A:
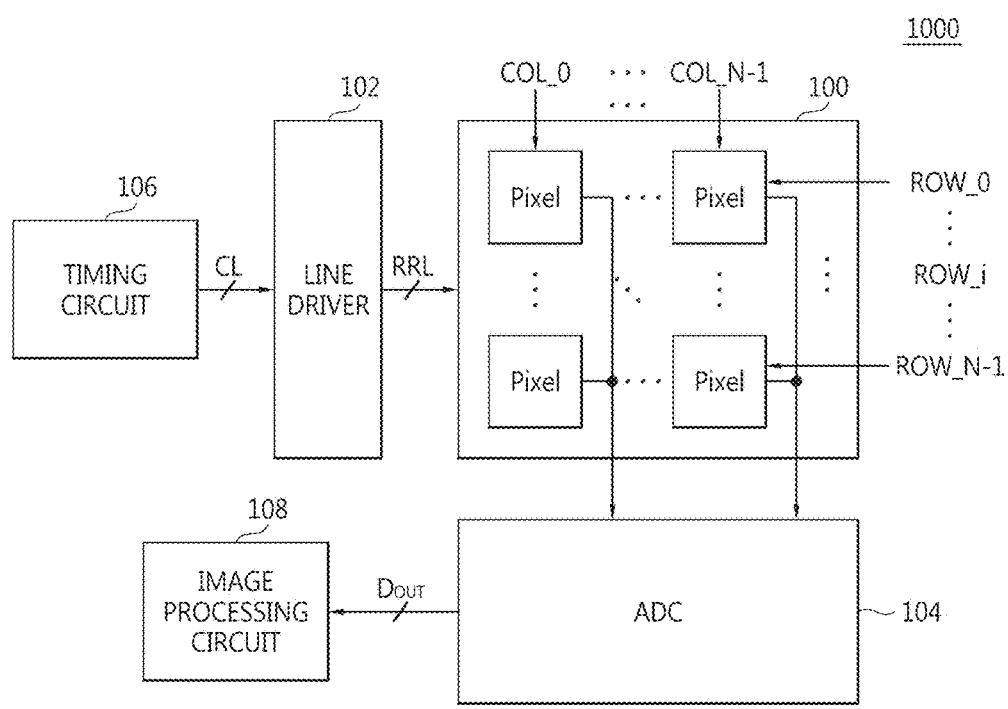
FIG. 1A is a block diagram illustrating an example embodiment of an image sensor.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., digital single lens reflex (DSLR) cameras, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As a result, example embodiments provide methods and systems for reducing these issues.

FIG. 1A is a block diagram of an image sensor 1000 according to an example embodiment. In the example shown in FIG. 1A, the image sensor 1000 is a complementary-metal-oxide-semiconductor (CMOS) image sensor. The image sensor 1000 may be embodied in a portable electronic device such as a digital camera, a mobile phone, a smart phone, a tablet personal computer (PC), a personal digital assistant (PDA), a mobile internet device (MID), or a wearable computer or another electronic device (e.g., laptop computer, etc.) including, associated with or connected to a camera. However, example embodiments should not be limited to this example.

Referring to FIG. 1A, a timing circuit 106 controls a line driver 102 through one or more control lines CL. In one example, the timing circuit 106 causes the line driver 102 to generate a plurality of transfer pulses (e.g., reset/shutter, sampling, readout, and/or selection). The line driver 102 outputs the transfer pulses to a pixel array 100 over a plurality of read and reset lines RRL. The read and reset lines RRL may include transfer lines, sampling lines, reset lines, and selection lines.

The pixel array 100 includes a plurality of pixels arranged in an array of rows ROW_0, . . . , ROW_i, . . . , ROW_N−1 and columns COL_0, . . . , COL_i, . . . , COL_N−1. As discussed herein, rows and columns may be collectively referred to as lines. Each of the plurality of read and reset lines RRL corresponds to a line of pixels in the pixel array 100 having a Bayer color pattern. In the example embodiment shown in FIG. 1A, each pixel is an active-pixel sensor (APS), and the pixel array 100 is an APS array.

As is known, in the Bayer color pattern, 'R' represents a pixel for sensing red color light, and 'B' represents a pixel for sensing blue color light. 'Gb' represents a pixel for sensing green color light in a row having alternating green and blue pixels, and 'Gr' represents a pixel for sensing green color light in a row having alternating green and red pixels.

Still referring to FIG. 1A, the analog-to-digital converter (ADC) 104 converts the output pixel data (e.g., voltages) from the i-th line ROW_i of readout pixels into a digital signal (also referred to herein as image data). The ADC 104 then outputs the image data to the image processing circuit 108. The image processing circuit 108 performs further processing so as to generate an image to be displayed on a display device (e.g., monitor, etc.) and/or stored in a memory (not shown).

Figures 1B, 1C:
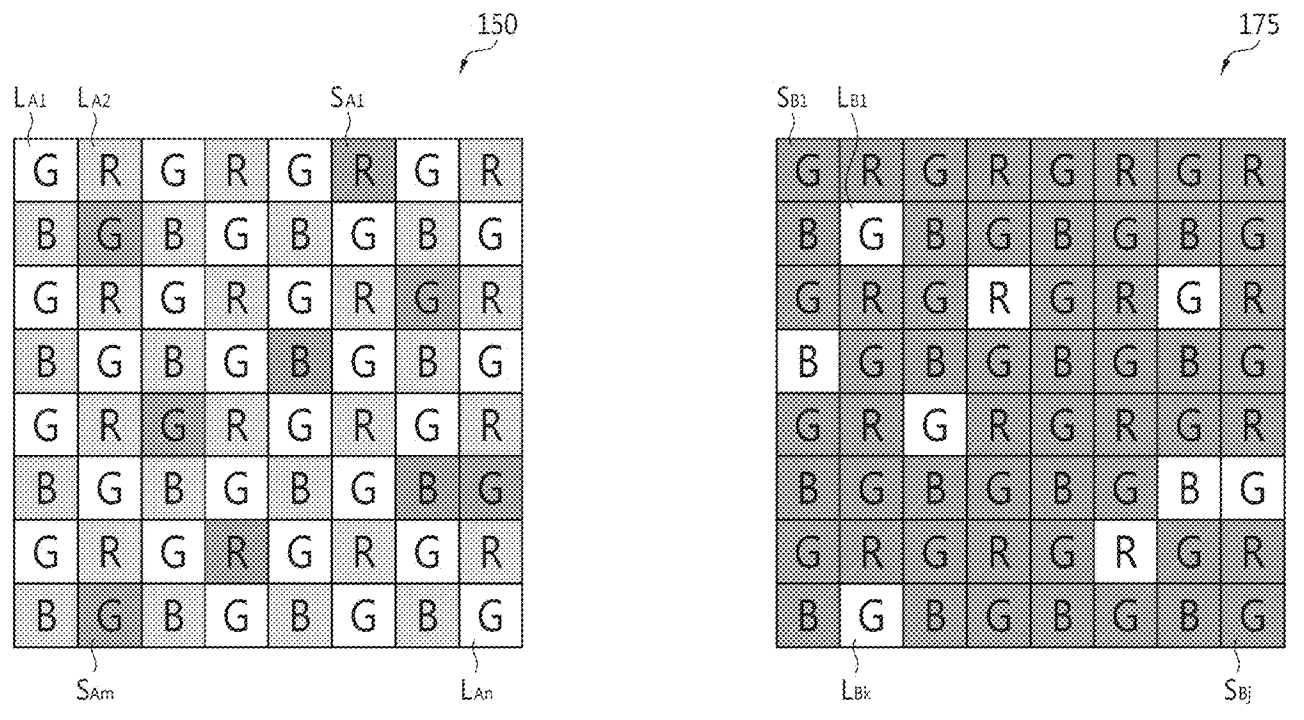

FIGS. 1B and 1C illustrate mosaic patterns for WDR according to example embodiments.

FIG. 1B illustrates a mosaic pattern 150. In an example embodiment, a pixel ratio (number of pixels with one exposure to number of pixels with another exposure) such as 1:1 between differing exposures may be used. In other example embodiments, a ratio of 1:4 and less (1:8, 1:32, 1:256, etc.) may be used.

As shown, the mosaic pattern 150 is arranged in a Bayer pattern. As is known, in a Bayer pattern layout, each pixel contains information that is relative to only one color component, for example, Red, Green or Blue. Generally the Bayer pattern includes a green pixel in every other space and, in each row, either a blue or a red pixel occupies the remaining spaces. To obtain a color image from a typical image sensor, a color filter (e.g., Bayer filter) is placed over sensitive elements of the sensor (e.g., pixel). The individual sensors are only receptive to a particular color of light, red, blue or green. The final color picture is obtained by using a color interpolation algorithm that joins together the information provided by the differently colored adjacent pixels.

The mosaic pattern 150 represents a long exposure frame with a sparse, short exposure mosaic. The sparse mosaic pattern 150 is referred to a long exposure frame because the pattern 150 consists mostly of long exposure pixels. The lighter colored pixels $L_{A1}$-$L_{An}$ are used for a long exposure and the darker colored pixels $S_{A1}$-$S_{Am}$ are used for a short exposure. The long exposure is longer than the short exposure.

FIG. 1C illustrates a mosaic pattern 175. As shown, the mosaic pattern 175 is arranged in a Bayer pattern. The mosaic pattern 175 represents a short exposure frame (i.e., consists mostly of short exposure pixels) with a long exposure mosaic. The darker colored pixels $S_{B1}$-$S_{Bj}$ are used for a short exposure frame and the lighter colored pixels $L_{B1}$-$L_{Bk}$ are used for a long exposure frame.

As discussed in more detail below with regard to FIGS. 2A through 5, the APS array 100 shown in FIG. 1A has a stacked pixel structure in which a photodiode and transfer circuit portion of each pixel circuit is formed on an upper chip (or substrate), and a sample and readout circuit portion of each pixel circuit is formed on a lower chip (or substrate). In at least one example embodiment, the upper chip includes only the photodiode and transfer circuit portion of each pixel circuit.

Figure 2A:
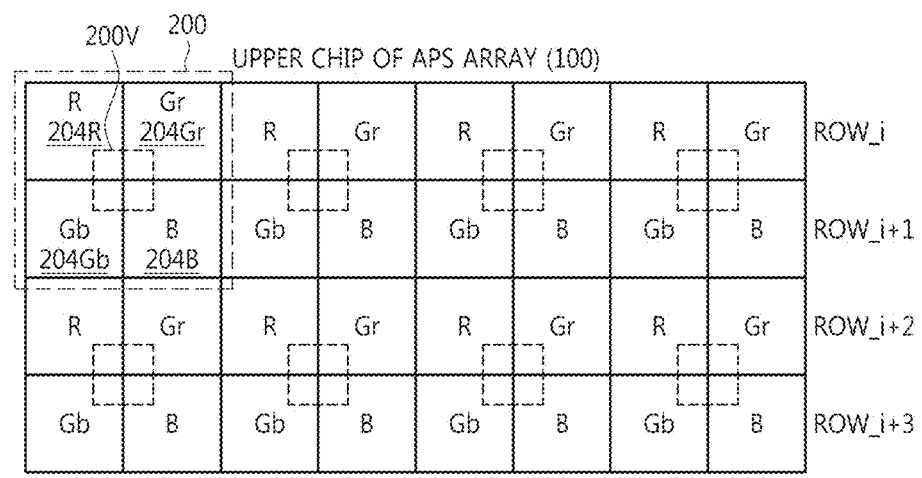
FIG. 2A illustrates a portion of an upper chip of the active pixel sensor (APS) array shown in FIG. 1A.
Figure 2B:
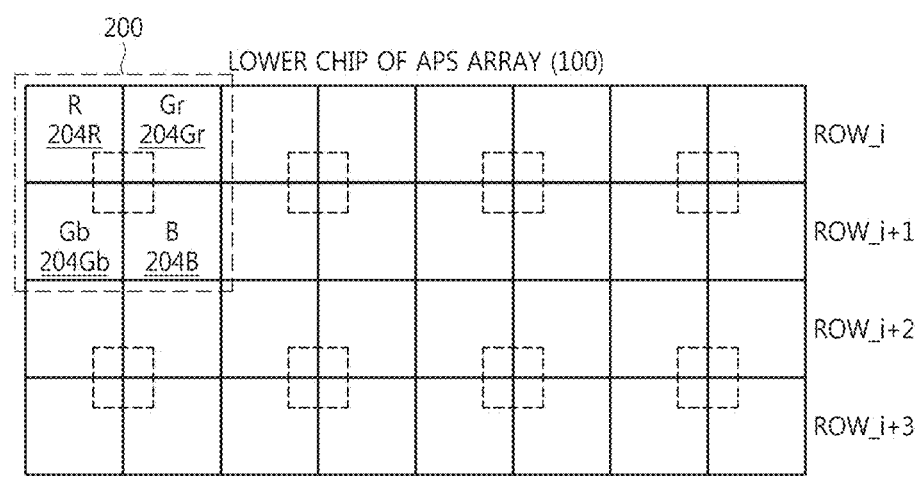
FIG. 2B illustrates a portion of a lower chip of the APS array 100 shown in FIG. 1A.

FIG. 2A illustrates portions of four adjacent rows ROW_i through ROW_i+3 of an example embodiment of an upper chip of the APS array 100 shown in FIG. 1A. FIG. 2B illustrates portions of four adjacent rows ROW_i through ROW_i+3 of an example embodiment of a lower chip of the APS array 100 shown in FIG. 1A.

Referring in more detail to FIG. 2A, an array of pixels is arranged in a Bayer pattern. For each group of four pixels red (R), green-red (Gr), green-blue (Gb), and blue (B), the photodiode and transfer circuit portion(s) of the pixel circuit on the upper chip is (are) electrically connected to the sample and readout circuit portion of the pixel circuit on the lower chip by a via 200V. In this regard, each group of pixels shares a single via 200V. However, example embodiments are not limited thereto. For example, a via may be used for pixels of a factor of 2 (e.g., 1, 2, 4 and 8). The via sharing can be in different shapes such as 1:1×1, 1:1×2, 1:2×1, 1:2×2, 1:1×4, 1:4×1, 1:8×1, 1:1×8, 1:4×2, 1:2×4 (VIA: Horizintal_pixel×Vertical_pixel).

Example embodiments will be discussed herein with regard to a pixel group 200, which includes a red pixel 204R, a green-red pixel 204Gr, a green-blue pixel 204Gb, and a blue pixel 204B. However, it should be understood that each group of four pixels may be structured and/or operate in the same or substantially the same manner.

Figure 3A:
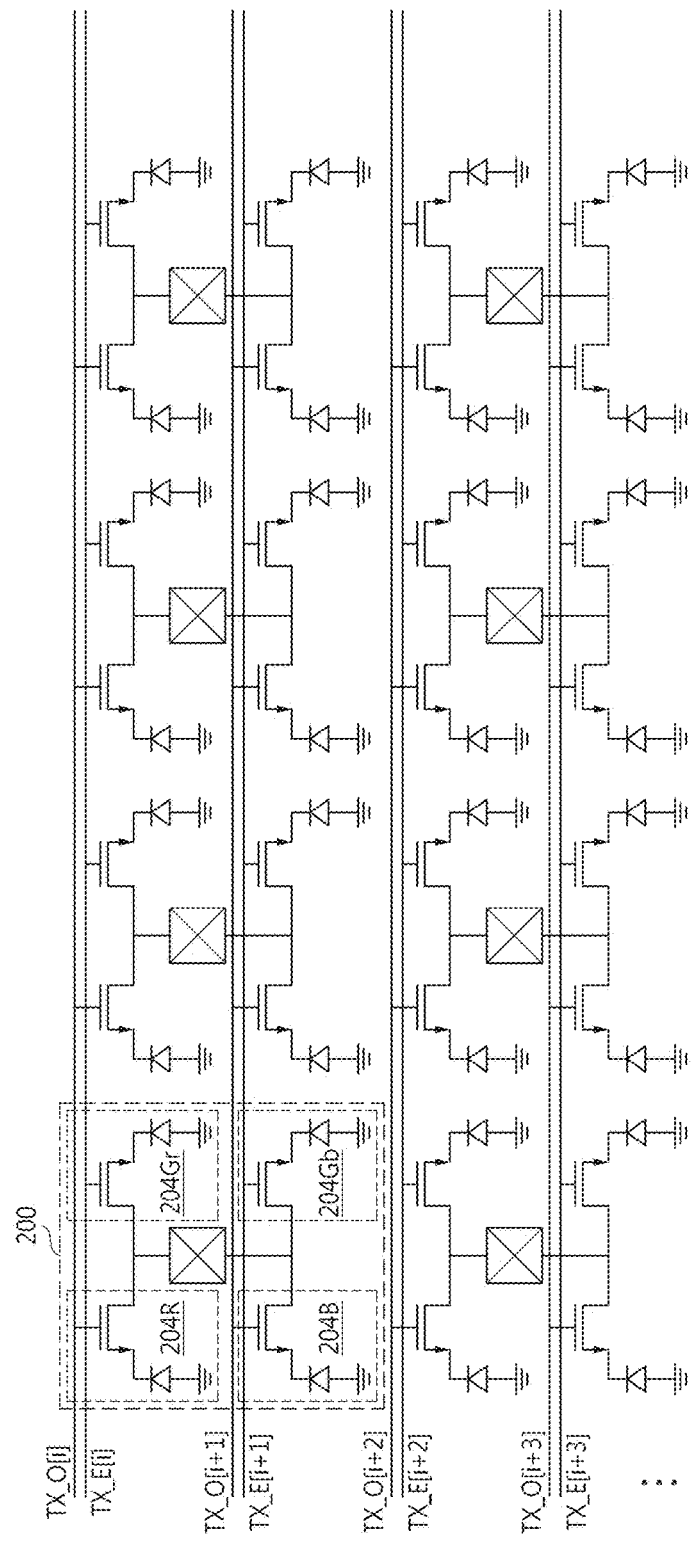
FIG. 3A is a circuit diagram illustrating a portion of a pixel circuit on the upper chip shown in FIG. 2A, according to an example embodiment.
Figure 3B:
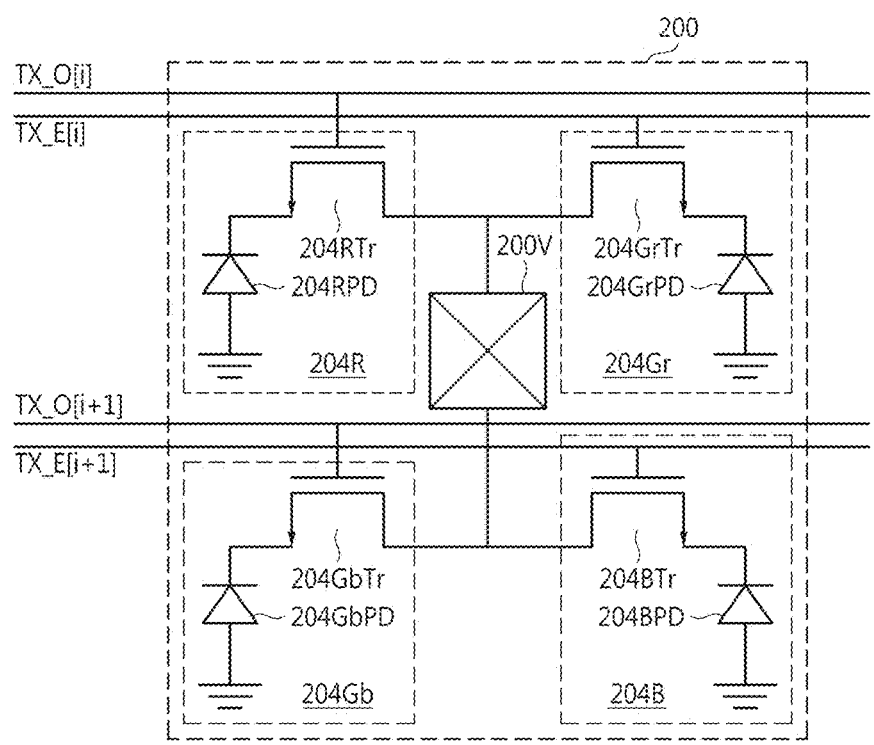
FIG. 3B is a more detailed circuit diagram of a portion of a pixel circuit for a group of pixels shown in FIG. 3A, according to an example embodiment.

FIG. 3A is a circuit diagram illustrating an example embodiment of the photodiode and transfer circuit portion of the pixel circuit on the upper chip shown in FIG. 2A. FIG. 3B is a more detailed circuit diagram illustrating the photodiode and transfer circuit portions for each of pixels 204R, 204Gr, 204Gb and 204B shown in FIG. 3A. The pixel group 200 may also be referred to as a unit pixel, and the pixels 204R, 204Gr, 204Gb and 204B referred to as sub-pixels in this context.

Referring to FIGS. 3A and 3B, the red pixel 204R includes a photodiode 204RPD and a transfer transistor 204RTr. The green-red pixel 204Gr includes a photodiode 204GrPD and a transfer transistor 204GrTr. The green-blue pixel 204Gb includes a photodiode 204GbPD and a transfer transistor 204GbTr. The blue pixel 204B includes a photodiode 204BPD and a transfer transistor 204BTr.

In this example, the transfer transistors 204RTr, 204GrTr, 204GbTr and 204BTr are N-channel metal-oxide semiconductor field effect transistors (MOSFETs). However, it should be understood that any suitable switching devices, transistors and/or circuits may be used.

Still referring to FIGS. 3A and 3B, the anode of the photodiode 204RPD is connected to ground, and the cathode of the photodiode 204RPD is connected to the source S of the transfer transistor 204RTr. The drain D of the transfer transistor 204RTr is electrically coupled to the sample and readout circuit portion of the pixel circuit on the lower chip through the via 200V. The gate G of the transfer transistor 204RTr is electrically coupled to transfer line TX_O[i]. The transfer line TX_O[i] is electrically coupled to gates G of transfer transistors for pixels in odd columns of the i-th row ROW_i of pixels of the APS array.

The anode of the photodiode 204GrPD is connected to ground, and the cathode of the photodiode 204GrPD is connected to the source S of the transfer transistor 204GrTr. The drain D of the transfer transistor 204GrTr is electrically coupled to the drain D of the transfer transistor 204RTr and to the sample and readout circuit portion of the pixel circuit on the lower chip through the via 200V. The gate G of the transfer transistor 204GrTr is electrically coupled to transfer line TX_E[i]. The transfer line TX_E[i] is electrically coupled to gates of transfer transistors for pixels in even columns of the i-th row ROW_i of pixels of the APS array.

The anode of the photodiode 204GbPD is connected to ground, and the cathode of the photodiode 204GbPD is connected to the source S of the transfer transistor 204GbTr. The drain D of the transfer transistor 204GbTr is electrically coupled to the drains D of the transfer transistors 204RTr and 204GrTr, and to the sample and readout circuit portion of the pixel circuit on the lower chip through the via 200V. The gate G of the transfer transistor 204GbTr is electrically coupled to transfer line TX_O[i+1]. The transfer line TX_O[i+1] is electrically coupled to gates of transfer transistors of pixels in odd columns of the (i+1)-th row ROW_i+1 of pixels of the APS array.

The anode of the photodiode 204BPD is connected to ground, and the cathode of the photodiode 204BPD is connected to the source S of the transfer transistor 204BTr. The drain D of the transfer transistor 204BTr is electrically coupled to the drains D of the transfer transistors 204RTr, 204GrTr and 204GbTr, and to the sample and readout circuit portion of the pixel circuit on the lower chip through the via 200V. The gate G of the transfer transistor 204BTr is electrically coupled to transfer line TX_E[i+1]. The transfer line TX_E[i+1] is electrically coupled to gates G of transfer transistors of pixels in even columns of the (i+1)-th row ROW_i+1 of pixels of the APS array.

As discussed above, the photodiode and transfer circuit portions of pixels on the upper chip of the APS array 100 are electrically coupled to the sample and readout circuits on the lower chip of the APS array 100 by vias 200V. In this example, each group of pixels 200 shares a via 200V.

Figure 4A:
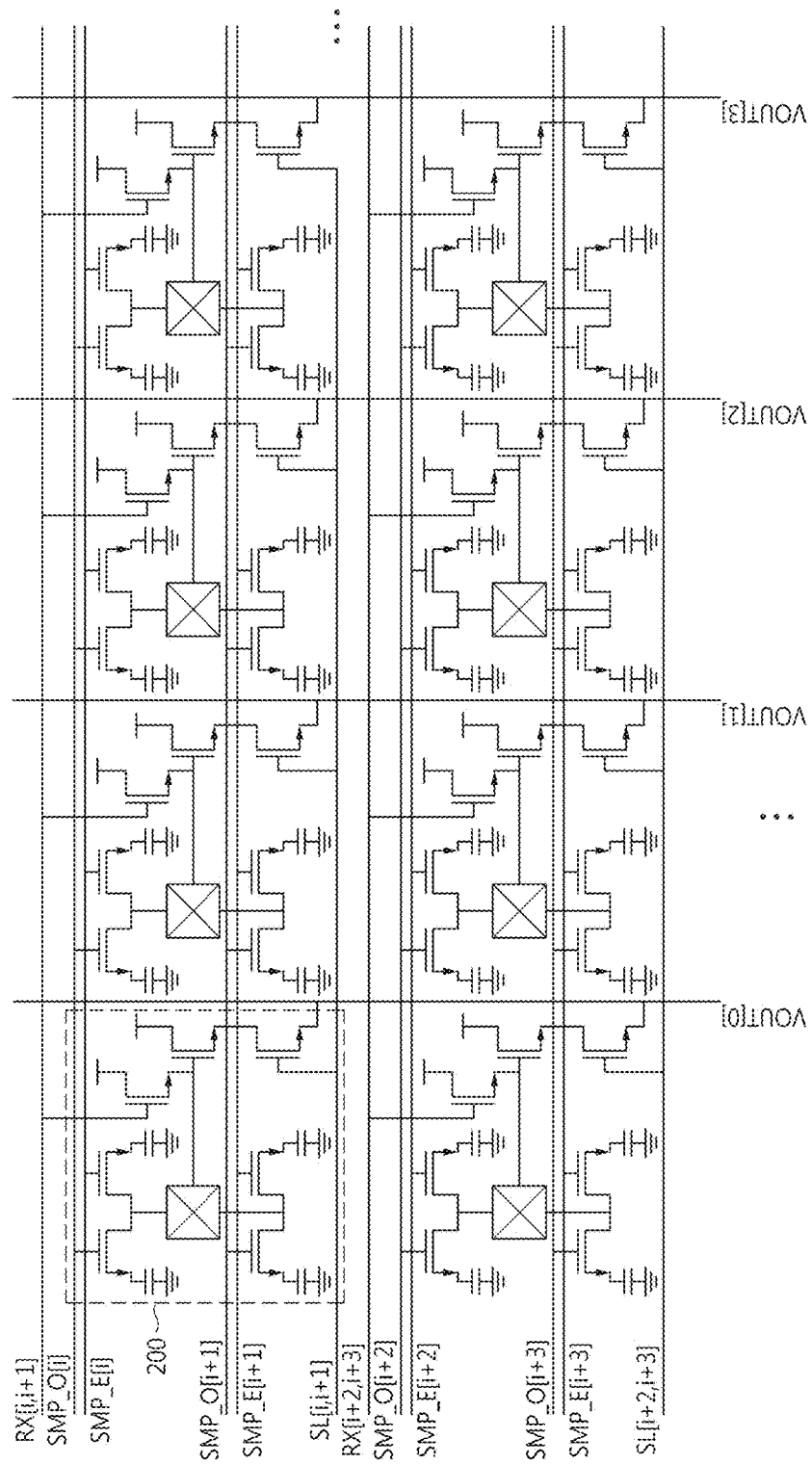
FIG. 4A is a circuit diagram illustrating a portion of a pixel circuit on the lower chip shown in FIG. 2B, according to an example embodiment.
Figure 4B:
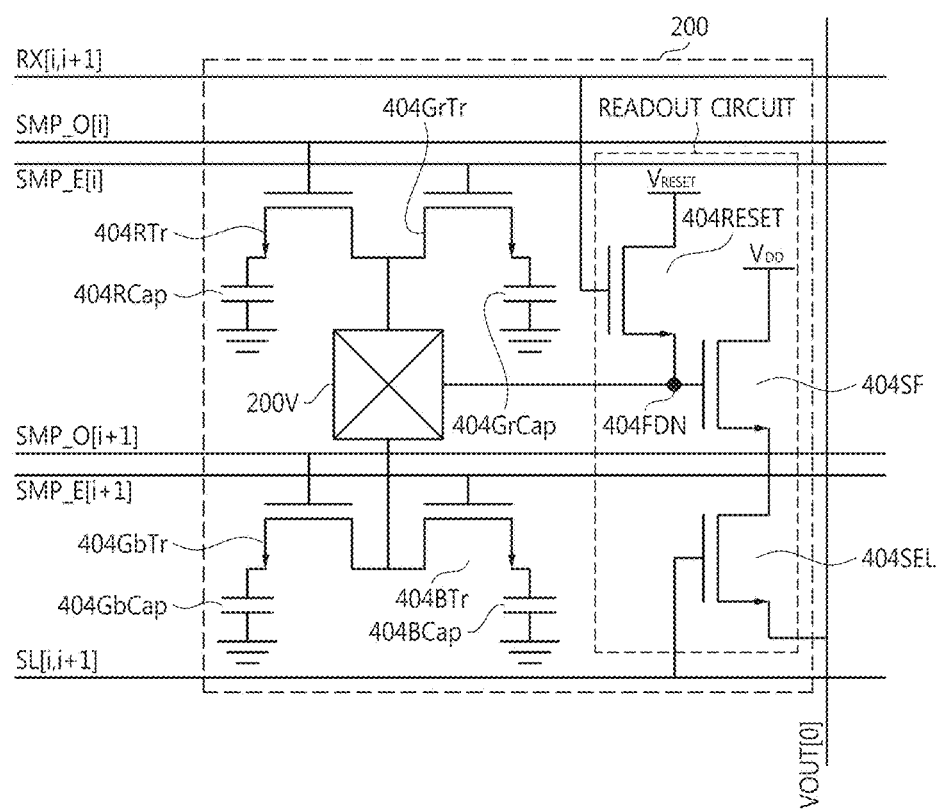
FIG. 4B is a more detailed circuit diagram of a portion of a pixel circuit for a group of pixels shown in FIG. 4A.

FIG. 4A is a circuit diagram illustrating a portion of a pixel circuit on the lower chip shown in FIG. 2B, according to an example embodiment. In more detail, FIG. 4A illustrates the sample and readout circuit portions on the lower chip shown in FIG. 2B. FIG. 4B is a more detailed circuit diagram of a sample and readout circuit portion corresponding to the photodiode and transfer circuit portion shown in FIG. 3B.

Referring to FIGS. 4A and 4B, the sample and readout circuit portions are arranged on the lower chip in an array of rows and columns. Each of the sample and readout circuit portions corresponds to photodiode and transfer circuit portions of a group of pixels. In this regard, each group of pixels shares a via 200V electrically connecting the circuits (or circuit portions) on the upper chip to the circuits (or circuit portions) on the lower chip of the APS array 100.

The sample and readout circuit portions for the pixels in the i-th and (i+1)-th rows ROW_i and ROW_(i+1) of the APS array are electrically coupled to a reset line RX[i,i+1], i-th sampling lines SMP_E[i] and SMP_O[i], (i+1)-th sampling lines SMP_E[i+1] and SMP_O[i+1], and a selection line SL[i,i+1].

The sample and readout circuit portions for pixels in the (i+2)-th and (i+3)-th rows ROW_i+2 and ROW_i+3 are electrically connected to a reset line RX[i+2,i+3], (i+2)-th sampling lines SMP_E[i+2] and SMP_O[i+2], (i+3)-th sampling lines SMP_E[i+3] and SMP_O[i+3], and a selection line SL[i+2,i+3].

The sample and readout circuit portions in a given column are electrically coupled to a corresponding one of output lines VOUT[0], VOUT[1], VOUT[2], VOUT[3], etc. The APS array 100 outputs pixel data to the ADC 104 via the output lines VOUT[0], VOUT[1], VOUT[2], VOUT[3]. According to example embodiments, a bias sink current is applied to the output lines VOUT[0], VOUT[1], VOUT[2], VOUT[3] (before analog-to-digital conversion (ADC)) to enable functionality of the source-follower transistors.

In FIGS. 4A and 4B, the sample and readout circuit portion includes a readout circuit and a plurality of sample and hold circuits. Each of the plurality of sample and hold circuits includes a sample and hold (SH) transistor and a pixel capacitor (also referred to as a sampling capacitor), and corresponds to a photodiode and transfer circuit for one of the pixels 204R, 204Gr, 204Gb and 204B.

In more detail with regard to FIG. 4B, the sample and hold circuit for the red pixel 204R includes a pixel capacitor 404RCap and a sample and hold transistor 404RTr.

The sample and hold circuit for the green-red pixel 204Gr includes a pixel capacitor 404GrCap and a sample and hold transistor 404GrTr.

The sample and hold circuit for the green-blue pixel 204Gb includes a pixel capacitor 404GbCap and a sample and hold transistor 404GbTr.

The sample and hold circuit for the blue pixel 204B includes a pixel capacitor 404BCap and a sample and hold transistor 404BTr.

Still referring to FIG. 4B, the readout circuit includes: a reset transistor 404RESET; a source-follower transistor 404SF; and a selection transistor (also referred to as select transistor) 404SEL.

The gate G of the source-follower transistor 404SF is connected to the source S of the reset transistor 404RESET at node 404FDN, which is a floating diffusion region. As is generally well-known, a floating diffusion region can be viewed as a capacitor or a deep potential well, which absorbs charges (e.g., all charges) from a photodiode. The capacitance of the floating diffusion region determines the conversion gain of the pixel; that is, how much voltage change is obtained per unit of charge.

A first electrode of the pixel capacitor 404RCap is coupled to ground, and a second electrode of the pixel capacitor 404RCap is electrically coupled to the source S of the sample and hold transistor 404RTr. The gate G of the sample and hold transistor 404RTr is electrically coupled to the sampling line SMP_O[i]. The drain D of the sample and hold transistor 404RTr is electrically coupled to the photodiode and transfer circuit portion on the upper chip, the drain D of each of the sample and hold transistors 404GrTr, 404BTr and 404GbTr, the source S of the reset transistor 404RESET and the gate G of the source-follower transistor 404SF through the via 200V.

A first electrode of the pixel capacitor 404GrCap is coupled to ground, and a second electrode of the pixel capacitor 404GrCap is electrically coupled to the source S of the sample and hold transistor 404GrTr. The gate G of the sample and hold transistor 404GrTr is electrically coupled to the sampling line SMP_E[i]. The drain D of the sample and hold transistor 404GrTr is electrically coupled to the photodiode and transfer circuit portion on the upper chip, the drain D of each of the sample and hold transistors 404RTr, 404BTr and 404GbTr, the source S of the reset transistor 404RESET and the gate G of the source-follower transistor 404SF through the via 200V.

A first electrode of the pixel capacitor 404GbCap is coupled to ground, and a second electrode of the pixel capacitor 404GbCap is electrically coupled to the source S of the sample and hold transistor 404GbTr. The gate G of the sample and hold transistor 404GbTr is electrically coupled to the sampling line SMP_O[i+1]. The drain D of the sample and hold transistor 404GbTr is electrically coupled to the photodiode and transfer circuit portion on the upper chip, the drain D of each of the sample and hold transistors 404RTr, 404GrTr and 404BTr, the source S of the reset transistor 404RESET and the gate G of the source-follower transistor 404SF through the via 200V.

A first electrode of the pixel capacitor 404BCap is coupled to ground, and a second electrode of the pixel capacitor 404BCap is electrically coupled to the source S of the sample and hold transistor 404BTr. The gate G of the sample and hold transistor 404BTr is electrically coupled to the sampling line SMP_E[i+1]. The drain D of the sample and hold transistor 404BTr is electrically coupled to the photodiode and transfer circuit portion on the upper chip, the drain D of each of the sample and hold transistors 404RTr, 404GrTr and 404GbTr, the source S of the reset transistor 404RESET and the gate G of the source-follower transistor 404SF through the via 200V.

Still referring to FIG. 4B, the drain D of the reset transistor 404RESET is connected to a reset voltage VRESET, and the gate G of the reset transistor 404RESET is electrically coupled to reset line RX[i,i+1].

The drain D of the source-follower transistor 404SF is connected to a voltage VDD, and the source S of the source-follower transistor 404SF is electrically coupled to the drain D of the selection transistor 404SEL.

The gate G of the selection transistor 404SEL is electrically coupled to the select line SL[i,i+1]. The source S of the selection transistor 404SEL is electrically coupled to output line VOUT[0].

As discussed above, in FIGS. 4A and 4B, the node 404FDN connecting the gate G of the source-follower transistor 404SF and the source S of the reset transistor 404RESET is a floating diffusion region.

Figure 5:
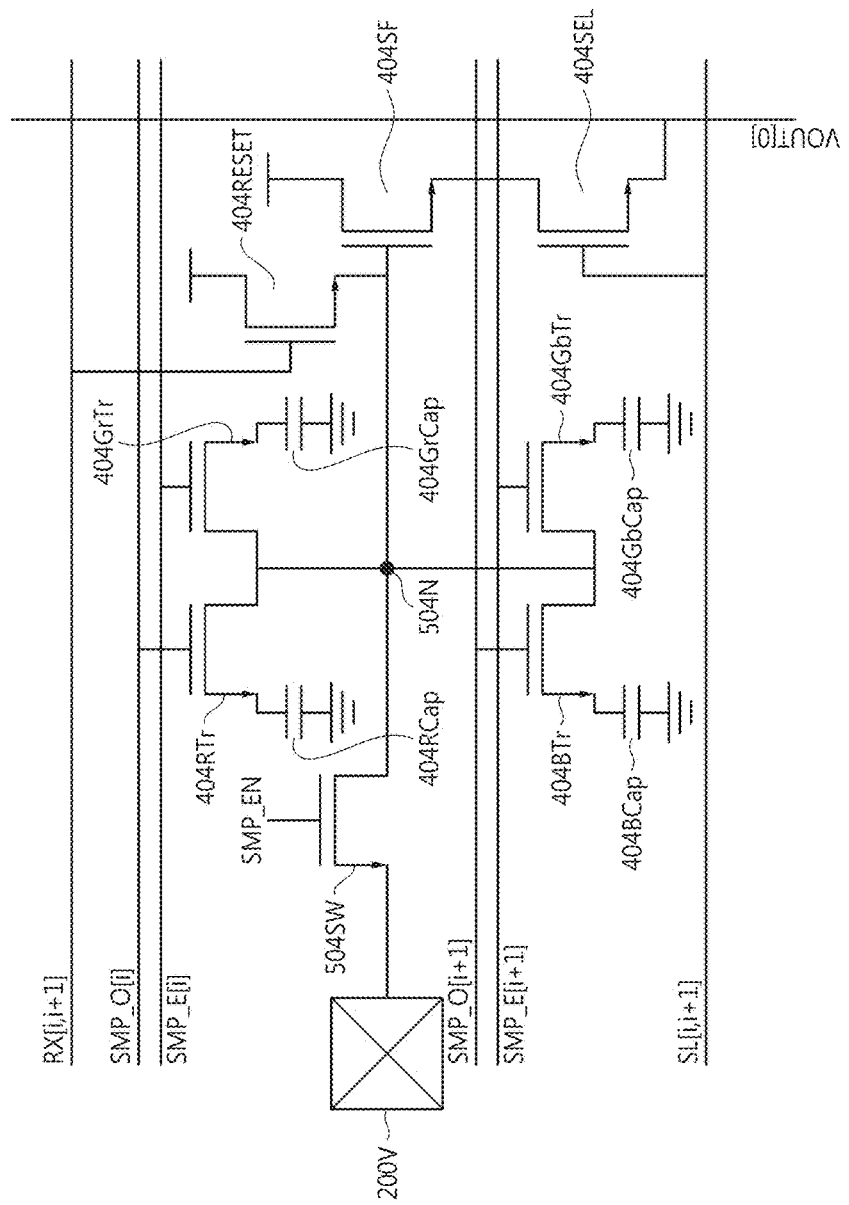
FIG. 5 illustrates an alternative structure of a sample and readout circuit portion on a lower chip of the APS array 100, according to an example embodiment.

FIG. 5 illustrates an alternative structure of a sample and readout circuit portion on a lower chip, according to an example embodiment. The example embodiment shown in FIG. 5 is similar to the example embodiment shown in FIG. 4B, but further includes a control switch (transistor) 504SW connected between the via 200V and a node (floating diffusion node) 504N at which the drain D of each of the sample and hold transistors 404RTr, 404GrTr, 404GbTr, 404BTr, the source S of the reset transistor 404RESET and the gate G of the source-follower transistor 404SF are connected. In the example embodiment shown in FIG. 5, the source S of the control transistor 504SW is electrically coupled to the via 200V and the drain S is electrically coupled to the node 504N. The gate G of the control transistor 504SW is coupled to a sampling enable signal SMP_EN. The control transistor 504SW is controlled to be in an ON state during a sampling phase and in an OFF state during the readout phase of the APS array.

Although example embodiments are described herein with regard to vias being shared among several pixels, each pixel may have a dedicated via to enable full-frame global shutter operation.

Example operation of the APS array 100 and the circuits shown in FIGS. 3A through 4B will be described in more detail below.

In CMOS image sensors employing an electronic rolling shutter, motion artifacts can be observed in the image when the captured scene includes fast moving objects. This is due to the different exposure time experienced by pixels in different lines.

Global shutter image sensors help eliminate such motion artifacts. Global shutter operation is achieved by adding a sampling node and a switch within the pixel. At the end of the exposure time, which is the same for all of the pixels, the accumulated charges are simultaneously transferred from the photodiode to an associated sampling capacitor (e.g., pixel capacitor 404RCap).

Motion artifacts (ghosting) can be observed in a case when the captured scene contains fast moving objects, which have moved between the start of the long exposure and the start of the short exposure.

In electronic rolling shutter this can lead to horizontal bands in the image and are conventionally solved by constraining the exposure time to be an integer multiple of the flicker period. Even in global shutter operation, where are the lines are exposed simultaneously, flicker can be observed as an overall difference of the image brightness from one frame to the next.

In multiple-exposure WDR schemes, flicker is hard to avoid since, conventionally, the short exposure time is almost always shorter than the flicker period.

One method of implementing dual exposure WDR is by applying a mosaic pattern on the pixel array, wherein some of the pixels are exposed for long periods of them, while the others experience short exposures, such as shown in FIGS. 1B-1C. When this method is applied, ghosting is slightly improved over other dual exposure schemes, since there is some overlap between the short and long exposures and they are read out at the same time.

Figure 6A:
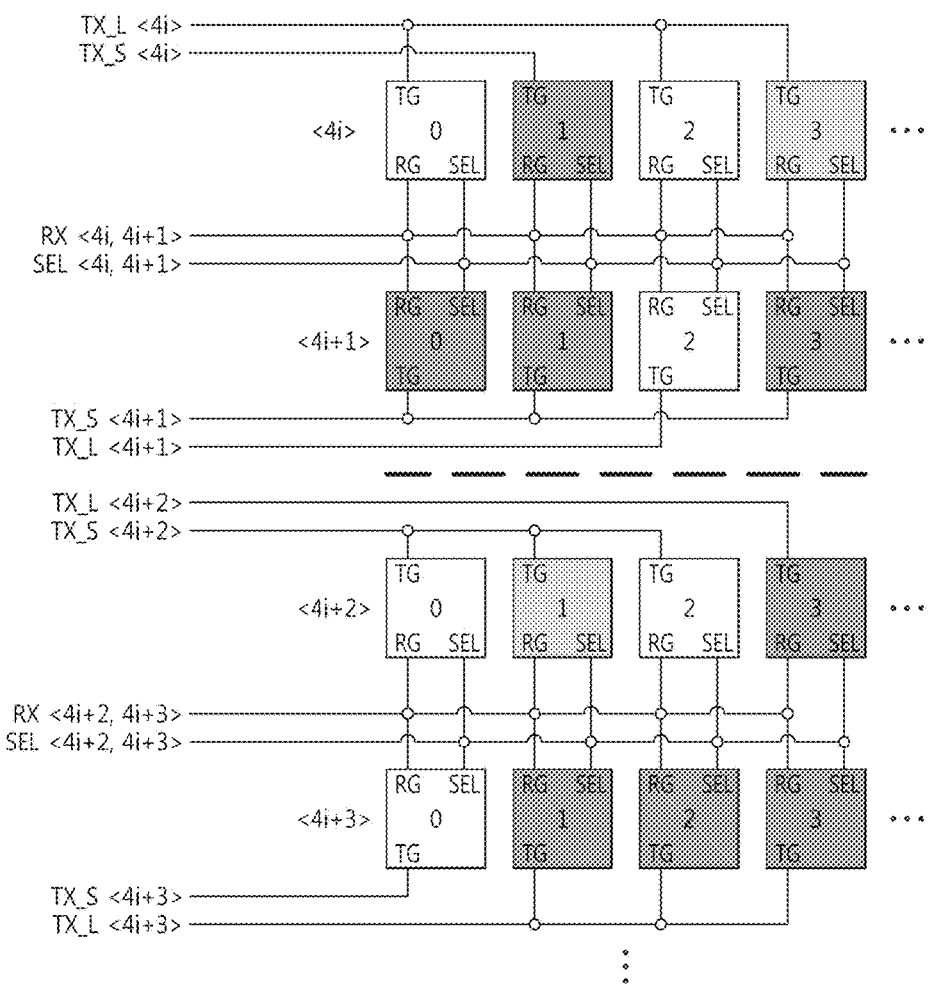
FIG. 6A illustrates a mosaic pattern for WDR according to an example embodiment.

FIG. 6A illustrates a mosaic pattern for WDR according to an example embodiment. While FIG. 6A illustrates a WDR example embodiment, it should be understood that the circuits shown in FIGS. 3A through 4B may be modified for WDR. For example, odd columned pixels may correspond to short exposure pixels and even columned pixels may correspond to long exposure pixels.

In other words, LONG/SHORT exposures are divided to ODD/EVEN columns, respectively, in FIGS. 3A-4B. However, a long/short pattern may be arranged in a manner other than odd/even columns. For example, in FIG. 6A, the connectivity of TX_* is changed according to 4×4 (vs 2×2 example in FIGS. 3A-4B).

As a result, each long exposure pixel is connected to one of transfer lines TX_L, and each short exposure pixel is connected to one of transfer lines TX_S. FIGS. 1B-1C are examples of an 8×8 WDR pattern.

In FIG. 6A, the pattern includes rows $4i$, $4i+1$, $4i+2$ and $4i+3$. Pixels associated with a short exposure are connected to the transfer lines TX_S in the rows $4i$, $4i+1$, $4i+2$ and $4i+3$ and pixels associated with a long exposure are connected to the transfer lines TX_L in the rows $4i$, $4i+1$, $4i+2$ and $4i+3$. As shown, the short exposure pixels and long exposure pixels are not correlated to odd column and even column.

Figure 6B:
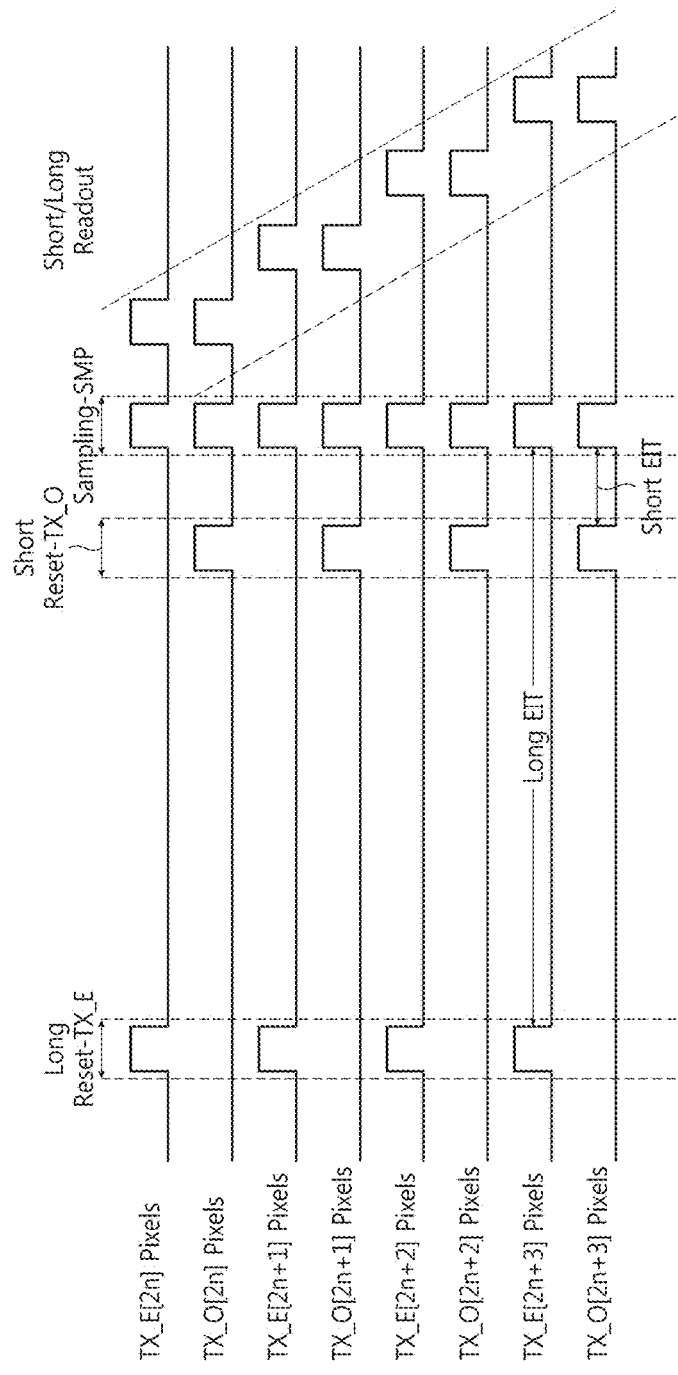
FIG. 6B illustrates a conventional timing diagram for WDR global shutter operation.

FIG. 6B illustrates a conventional timing diagram for WDR global shutter operation.

As shown in FIG. 6B, the long exposure pixels are reset at a time before the short exposure pixels are reset. Thus, the long exposure pixels experience a longer exposure integration time (EIT) than the short exposure pixels. The exposure integration time is the time between a reset pulse and a corresponding sampling pulse.

In FIG. 6B, the short and long exposure times are not completely overlapping. Therefore, motion artifacts may still occur, as well as frame-to-frame flicker.

The technology of global shutter with a sampling capacitor, such as described in FIGS. 3A-4B, gives the flexibility to separate a single exposure time into several exposures and accumulate all of the charges from these exposures onto the capacitor. Thus, the short exposure time may be separated into several intervals so that they may cover the entire range of the long exposure time.

FIG. 7A illustrates a timing diagram for WDR global shutter operation according to an example embodiment.

As may be seen in FIG. 7, a short exposure integration time is spread out into several intervals, while maintaining the same total short exposure time. This leads to reduced motion artifacts between long and short exposure images. The figure demonstrates four separate short exposure intervals which cover the entire long exposure period. The reduction of motion artifacts is due to fact that both short and long exposure integration times cover the same period and, therefore, span the same scene and movement in the image.

FIG. 7A is a timing diagram for describing example operation of the APS array 100 during an exposure period (also sometimes referred to as an integration period).

The timing diagram shown in FIG. 7A illustrates transfer pulses applied to transfer lines and sampling lines that are electrically connected to the APS array 100 shown in FIG. 1A. In this regard, transfer lines TX_E[$2n$] are transfer lines connected to pixels in even rows and even columns of the APS array 100, transfer lines TX_O[$2n$] are transfer lines connected to pixels in even rows, but odd columns of the APS array 100, transfer lines TX_E[$2n+1$] are transfer lines connected to pixels in odd rows, but even columns of the APS array 100, and transfer lines TX_O[$2n+1$] are transfer lines connected to pixels in odd rows and odd columns of the APS array 100.

In FIG. 7A, the odd columned pixels are short exposure pixels and the even numbered pixels are long exposure pixels. However, example embodiments are not limited thereto. Short exposure pixels and long exposure pixels may be arranged in another manner. For example, FIG. 6A illustrates how short exposure and long exposure pixels may be arranged in an alternative manner.

Although not shown in FIG. 7A, RX[n] represents the reset lines connected to respective rows of the APS array 100, and SL[n] represents selection lines connected to respective rows of the APS array 100.

In FIG. 7A, n is a value between 0 and N−1, and the number of rows in the APS array 100 is N. In at least some cases, the example shown in FIG. 7A will be described with regard to the portion of the APS array 100 shown in FIGS. 3A through 4B.

Referring to FIG. 7A, according to at least one example embodiment, the line driver 102 triggers exposure (and start of the exposure period or interval) of the APS array 100 by sequentially applying a reset transfer pulse (also referred to as a reset pulse or a shutter pulse) to transfer lines TX_E[$2n$], TX_O[$2n$], TX_E[$2n+1$], TX_O[$2n+1$], TX_E[$2n+2$], TX_O[$2n+2$], TX_E[$2n+3$] and TX_O[$2n+3$]. During an exposure period, the photodiodes at each pixel associated with the exposure period prod and accumulate charges in response to incident light to generate image data later used to obtain an image. During the exposure period, the reset transistors may be maintained in the ON state by applying a logic high signal to the reset lines RX[n], whereas the select lines SL[n] may be maintained at a logic low level such that the select transistors remain in the OFF state.

In more detail, at time t1-t2, the line driver 102 applies a reset transfer pulse to all of the transfer lines TX_E and TX_O to initiate long and short exposure periods for pixels of the APS array 100. However, example embodiments are not limit thereto.

At t3-t4, the line driver 102 applies a sampling pulse to the sampling lines SMP_O connected to the short exposure pixels. Concurrently with the application of the sampling pulse, the line driver 102 may apply a logic low signal to the reset lines RX[n] to switch the reset transistor 404RESET to the OFF state. The line driver 102 may continue to apply a logic low signal to the reset lines RX[n] until the short exposure interval of the APS array 100 is complete.

After each SMP pulse the associated sampling capacitor accumulates charges that have been transferred from the diode by the relevant transfer gate.

As described above, the total short exposure period is divided into short exposure intervals (short EIT). By applying a reset pulse at t1-t2 and a sampling pulse at t3-t4, a short exposure interval occurs between t2-t3.

At time t5-t6, the line driver 102 applies a reset transfer pulse to the transfer lines connected to pixels in odd columns TX_O to trigger a short exposure period for the pixels of the APS array 100 connected to the transfer lines TX_O. This process also occurs at t9-t10.

Similarly, the line driver 102 applies sampling pulses to the sampling lines SMP_O connected to the short exposure pixels at t7-t8 and t11-t12, thereby creating short exposure intervals. Thus, FIG. 7A illustrates four (4) short exposure intervals.

In addition to applying sampling pulses to the sampling lines SMP_O connected to the short exposure pixels at t11-t12, the line driver 102 also applies sampling pulses to the sampling lines SMP_E connected to the long exposure pixels at t11-t12. Thus, the long exposure period is from t2-t11.

At t13, t14, t15 and t16, the line driver 102 applies readout transfer pulses to the lines $2n$, $2n+1$, $2n+2$, $2n+3$, respectively. After the last SMP pulse, the data of all the pixels is been stored in the sampling capacitors. A readout is performed by using an SL pulse for the associated line (e.g., SL[i] for the ith row). For example, to read the R pixel value from the sampling capacitor, the transistor 404RTr is opened by using SMP_O[i] pulse, turning the reset transistor off, turning the SL transistor on. As a result, the data transferred from the associated sampling capacitor to VOUT.

As may be seen in FIG. 7A, the short exposure integration time is spread out into several periods, while maintaining the same total short exposure time. This leads to reduced motion artifacts between long and short exposure images. The four separate short exposure intervals which cover the entire long exposure period. The reduction of motion artifacts is due to fact that both short and long exposure integration times cover the same period and therefore span the same scene and movement in the image.

As shown in FIG. 7A, according to at least this example embodiment, the short and long exposure periods for groups of pixels connected to corresponding sets of transfer lines TX_E[2n], TX_O[2n], TX_E[2n+1], and TX_O[2n+1] overlap (e.g., substantially overlap) with one another.

After expiration (at the end) of the long and short exposure periods (or interval), the stored pixel data signals (also sometimes referred to herein as pixel data) are readout from the pixels.

FIG. 7B illustrates a flicker signal and the correspondence with timing described in FIG. 7A.

The image sensor 1000 may set the time of each of the short exposures in a way that flicker signal will be cancelled. FIG. 7B presents the potential of setting the time of each of the short exposures at the opposite period of the flicker period. A gap of 10 ms/8.33 ms between the short exposure intervals may be maintained when considering 50 Hz/60 Hz frequencies, respectively. As a result, the overall flicker signal over the 4 different periods cancels out, resulting in zero flicker.

Figure 8:
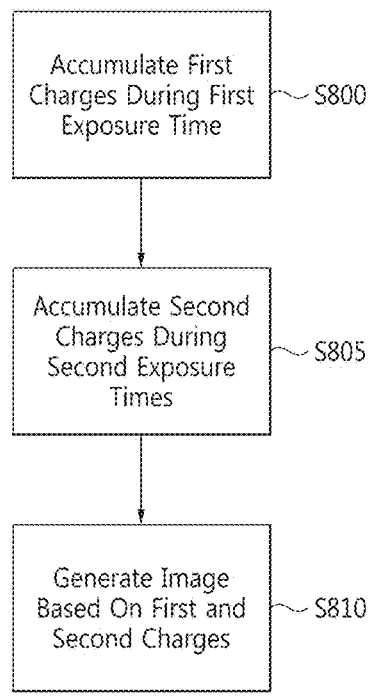
FIG. 8 illustrates a method of generating an image using a global shutter image sensor according to an example embodiment.

FIG. 8 illustrates a method of generating an image using a global shutter image sensor according to an example embodiment. The method of FIG. 8 may be performed by the image sensor 100.

At S800, the image sensor accumulates a first plurality of charges during a first exposure time from a first plurality of pixels. For example, the image sensor accumulates the first plurality of charges from the plurality of pixels associated with a long exposure over the long exposure interval.

At S805, the image sensor accumulates a second plurality of charges during a plurality of second exposure times from a second plurality of pixels. For example, the image sensor accumulates the second plurality of charges from the plurality of pixels associated with a short exposure over the short exposure intervals.

At S810, the image sensor reads out the accumulated charges and may generate an image based on the accumulated first and second charges.

Figure 9:
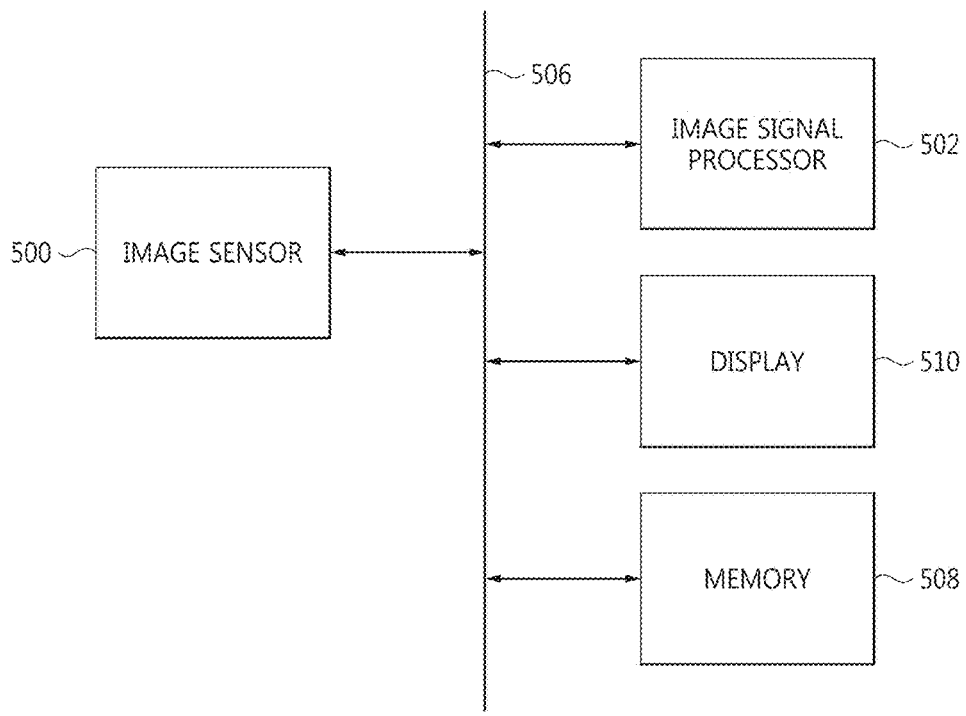
FIG. 9 is a block diagram illustrating an electronic imaging system according to an example embodiment.

FIG. 9 is a block diagram illustrating an electronic imaging system according to an example embodiment.

Referring to FIG. 9, the electronic imaging system includes: an image sensor 500; an image signal processor (ISP) 502; a display 510; and a memory 508. The image sensor 500, the ISP 502, the display 510 and the memory 508 communicate with one another via a bus 506.

The image sensor 500 may be an image sensor according to example embodiments described herein. The image sensor 500 is configured to capture image data by converting optical images into electrical signals. The electrical signals are output to the ISP 502.

The ISP 502 processes the captured image data for storage in the memory 508 and/or display by the display 504. In more detail, the ISP 502 is configured to: receive digital image data from the image sensor 500; perform image processing operations on the digital image data; and output a processed image or processed image data. The ISP 502 may be or include the image processing circuit 108 shown in FIG. 1A.

The ISP 502 may also be configured to execute a program and control the electronic imaging system. The program code to be executed by the ISP 502 may be stored in the memory 508. The memory 508 may also store the image data and/or images acquired by the image sensor and processed by the ISP 502. The memory 508 may be any suitable volatile or non-volatile memory.

The electronic imaging system shown in FIG. 9 may be connected to an external device (e.g., a personal computer or a network) through an input/output device (not shown) and may exchange data with the external device.

The electronic imaging system shown in FIG. 9 may embody various electronic control systems including an image sensor, such as a digital still camera. Moreover, the electronic imaging system may be used in, for example, mobile phones, personal digital assistants (PDAs), laptop computers, netbooks, MP3 players, navigation devices, household appliances, or any other device utilizing an image sensor or similar device.

As described, example embodiments reduce motion and flicker artifacts in WDR scenes for global shutter sensors with an in-pixel sampling capacitor. This is achieved by applying multiple charge transfers of short exposure pixels' charge which are spread along the long exposure pixels' integration time in order to create similar overall period between the long and short exposure scenes.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A method of generating an image using a global shutter image sensor, the method comprising:
    accumulating a first plurality of charges during a first exposure time from a first plurality of pixels;
    accumulating a second plurality of charges during a plurality of second exposure times from a second plurality of pixels, the plurality of second exposure times occurring during the first exposure time and being shorter than the first exposure time, each of the plurality of second exposure times being based on a flicker signal and half of the plurality of second exposure times corresponding to a positive portion of the flicker signal and another half of the plurality of second exposure times corresponding to a negative portion of the flicker signal; and
    generating the image based on the first plurality of charges and the second plurality of charges.

2. The method of claim 1, wherein the first plurality of pixels and the second plurality of pixels are in a same row of the global shutter image sensor.

3. The method of claim 2, further comprising:
    first sampling the accumulated second plurality of charges after each second exposure time.

4. The method of claim 3, further comprising:
    second sampling the accumulated first plurality of charges after the first exposure time.

5. The method of claim 4, wherein the first sampling and the second sampling end at the same time.

6. The method of claim 1, further comprising:
transferring the first plurality of charges and the second plurality of charges at a same time.

7. The method of claim 2, wherein a portion of the first plurality of pixels and a portion of the second plurality of pixels are connected to a common readout circuit.

8. The method of claim 1, wherein a portion of the first plurality of pixels are in a first row and a second row and a portion of the second plurality of pixels are in the first row and the second row, and the portion of the first plurality of pixels and the portion of the second plurality of pixels are connected to a common readout circuit.

9. An image processing system comprising:
an image sensor configured to,
   accumulate a first plurality of charges during a first exposure time from a first plurality of pixels; and
   accumulate a second plurality of charges during a plurality of second exposure times from a second plurality of pixels, the plurality of second exposure times occurring during the first exposure time and being shorter than the first exposure time, each of the plurality of second exposure times being based on a flicker signal and half of the plurality of second exposure times corresponding to a positive portion of the flicker signal and another half of the plurality of second exposure times corresponding to a negative portion of the flicker signal; and
a processor configured to generate an image based on the first plurality of charges and the second plurality of charges.

10. The image processing system of claim 9, wherein the first plurality of pixels and the second plurality of pixels are in a same row of the image sensor.

11. The image processing system of claim 10, wherein the processor is configured to sample the accumulated second plurality of charges after each second exposure time.

12. The image processing system of claim 11, wherein the processor is configured to sample the accumulated first plurality of charges after the first exposure time.

13. The image processing system of claim 12, wherein the sampling of the accumulated second plurality of charges and the sampling of the accumulated first plurality of charges end at the same time.

14. The image processing system of claim 9, wherein the processor is configured to transfer the first plurality of charges and the second plurality of charges at a same time.

15. The image processing system of claim 10, wherein a portion of the first plurality of pixels and a portion of the second plurality of pixels are connected to a common readout circuit.

16. The image processing system of claim 9, wherein a portion of the first plurality of pixels are in a first row and a second row and a portion of the second plurality of pixels are in the first row and the second row, and the portion of the first plurality of pixels and the portion of the second plurality of pixels are connected to a common readout circuit.

* * * * *